May 11, 1948.   E. MITTELMANN   2,441,435
REMATCHING RELAY CONTROL SYSTEM
Filed Aug. 3, 1945
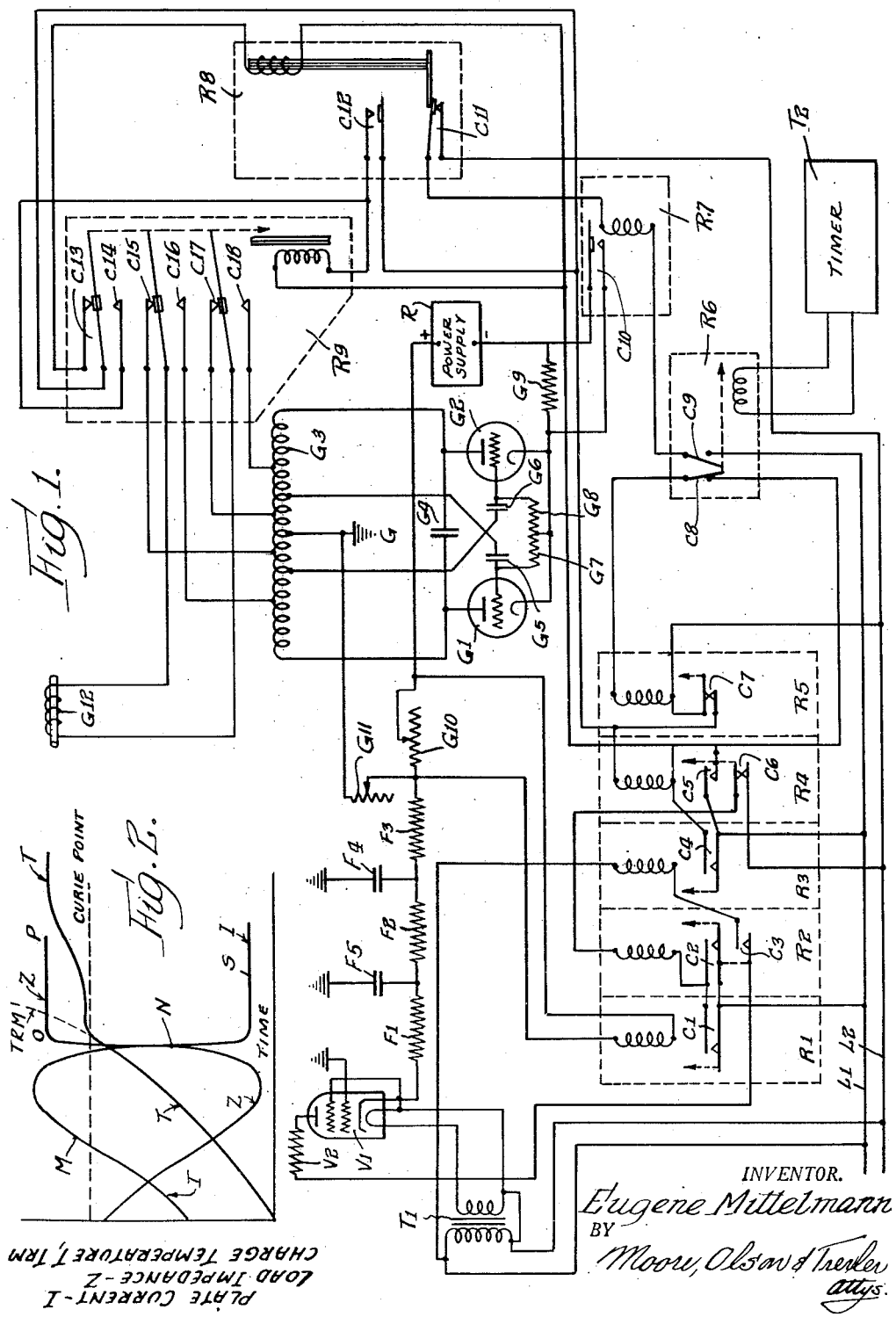
INVENTOR.
Eugene Mittelmann
BY
Moore, Olson & Trexler
attys.

Patented May 11, 1948

2,441,435

UNITED STATES PATENT OFFICE 2,441,435

REMATCHING RELAY CONTROL SYSTEM

Eugene Mittelmann, Chicago, Ill., assignor to Illinois Tool Works, Chicago, Ill., a corporation of Illinois Application August 3, 1945, Serial No. 608,769

5 Claims. (Cl. 250—36)

The present invention relates to an apparatus for heating by means of high frequency electric current.

The object of the invention is to secure optimum transfer of energy from a high frequency generator to the material or object to be heated by matching the reflected load impedance to the generator impedance. It is known that the load impedance changes appreciably when for instance a piece of metal is being treated. During that portion of the time that the magnetic flux is threading through the metal, the load presents a certain impedance to the generator. After the metal has been heated to a certain degree, a point is reached known as the point of magnetic transformation where the magnetic permeability becomes unity. At the time that the permeability of the metal becomes unity, the load impedance increases. The generator may be rematched to the new load impedance by a suitable switching arrangement.

When the generator is rematched to the new load impedance, the operation continues for a predetermined time in accordance with the present control apparatus. In order to provide automatic rematching of the generator to the load when the point of magnetic transformation or Curie point is reached a control circuit must be provided which responds to a certain cycle of operation which prevents erroneous switching of the load, particularly when the generator is first started in operation. In accordance with the present invention this is accomplished by providing an improved control circuit which is relatively simple and reliable in operation. This control circuit utilizes a single control tube and a set of sequence operated control relays.

It, therefore, is an object of the present invention to provide an improved control system for rematching the load of a high frequency generator upon the occurrence of predetermined operating conditions encountered during the process.

It is a further object of the present invention to provide a relatively simple and economical control system for a high frequency generator for rematching the impedance of the generator to the impedance of the load.

Other and further objects of the present invention subsequently will become apparent by reference to the following description taken in connection with the accompanying drawing wherein Figure 1 is a circuit diagram illustrating the present invention; and Figure 2 is a graph illustrating the time-temperature curve of a metal member heated at high frequency, the variations in impedance imposed on the oscillator and the variations in anode current of the oscillator during the time of the heating operation. It also illustrates the effect of my invention on the time-temperature curve.

In Figure 1 there is shown a high frequency generator G of the tuned grid tuned plate circuit type employing a pair of power vacuum tubes G1 and G2. The anodes of the vacuum tubes G1 and G2 are connected to a tank coil G3 which is tuned by a tank coil capacitor G4. The grids of the vacuum tubes are coupled by grid capacitors G5 and G6 to intermediate points on the tank inductor G3. The grids of the vacuum tubes G1 and G2 are also provided with grid resistors G7 and G8 connected to the cathode. The cathodes of the vacuum tubes are connected through a power cut-off resistor G9 to the negative side of a source of anode voltage provided by the rectifier R. The positive terminal of the rectifier R is connected to adjustable series resistors G10 and G11 which are connected to ground. The midpoint on the tank coil of the inductor G3 is also connected to ground.

The tank coil G3 is provided with a plurality of taps arranged to be interconnected by the switch contacts of a relay R9 to a load coil G12.

A series of relays are provided which are arranged to operate in a predetermined sequence in response to predetermined occurrences or changes in condition of the operation of the generator G. The relay R1 which has a pair of normally open contacts C1 is arranged to be energized in response to the voltage drop appearing across the resistor G10. The resistor G10 being in the plate supply circuit of the generator G is of such value with respect to the characteristics of the relay R1 that the relay will operate only at a certain point when the characteristic curve of the operation is on the upward trend toward a maximum.

The point of operation of the relay R1, therefore, corresponds to the point M on the curve shown in Figure 2. The normally open contacts of the relay R1 are connected between one side of a pair of alternating current conductors L1 and L2 and the energizing coil of another relay R2 which is connected through a pair of normally closed contacts C6 of a relay R4 to the other alternating current conductor. The relay R2 is provided with a pair of normally open circuit contacts C2 arranged in parallel to the normally open circuit contacts C1 of the relay R1 so that when the relay R2 is energized these contacts C2 lock the relay R2 into closed circuit operation.

The relay R2 has another pair of normally open circuit contacts C3 which are connected in series between the energizing coil of a relay R3 and a circuit associated with a Thyratron control tube VI. The circuit may be traced from the anode of the vacuum tube VI through a current limiting resistor V2 through the pair of contacts C3 of the relay R2, the energizing coil of the relay R3, one side of the primary winding of a transformer TI, a connection from the other side of the primary winding of the transformer TI to the secondary winding which is connected by suitable conductors to the filament and to the cathode of the vacuum tube VI.

The vacuum tube VI has its screen grid connected to its cathode. The control grid of the vacuum tube VI is connected to ground. The cathode of the vacuum tube is connected to one terminal of a filter having impedance elements F1, F2, and F3 arranged in series and connected to the common juncture between the resistors G10 and G11. The junctures between the impedance elements F1, F2, and F3 are by-passed to ground by suitable filter capacitors F4 and F5 so that the control potential appearing between the grid and cathode of the vacuum tube VI is filtered and corresponds to the potential appearing across the resistor G11 which has one terminal grounded. The vacuum tube VI therefore is arranged to be rendered conductive when the potential appearing across the resistor G11 drops below a predetermined value, which corresponds to the point N on the curve in Figure 2.

The relay R3 which is energized by the conductivity of the vacuum tube VI is provided with a pair of normally open contacts C4 interposed between one of the alternating current conductors L1 and one terminal of the energizing coil of a relay R4. The other terminal of the energizing coil of the relay R4 is connected through the normally closed pair of contacts C7 of a relay R5 to the other alternating current conductor L2. The relay R4 is provided with a pair of normally open contacts C5 connected between the conductor L1 and one terminal of the energizing coil of the relay so that when the relay is energized it locks itself into energized position. The relay R4 is also provided with a pair of normally closed contacts C6 connected between the line conductor L2 and one terminal of the energizing coil of the relay R2.

Connected in parallel with the energizing coil of the relay R4 are the energizing coil of the relay R8 and the energizing coil of the relay R9. The energizing coil of the relay R9, however, is not normally energized at the same time that the coils of the relays R4 and R8 are energized because it is connected in series with a pair of normally open contacts C12 of the relay R8.

The energizing coil of the relay R5 is connected between the line conductor L2 and a pair of normally closed contacts C8 of a relay R6 which in turn are connected to one end of the energizing coil of the relay R5 and one of the contacts of the normally open pair of contacts C5. The other contact of the pair of normally open contacts C5 is connected to the other line conductor L1. The relay R6 has its energizing coil arranged to be energized by the operation of a timer T2 which predetermines the operating time of the oscillator G. The relay R6 is provided with a pair of normally open contacts C9 connected between the line conductor L1 and the energizing coil of a relay R7 which in turn is connected through a pair of normally closed contacts C11 of relay R8 to the other line conductor L2. The relay R7 is provided with a pair of normally open contacts C10 arranged to short circuit the power cut off resistor G9 in the cathode circuit of the vacuum tubes G1 and G2. When the relay R7 is operated, the contacts thereof are closed to short circuit the resistor G9 thereby to initiate oscillations of the generator G.

The relay R8 has a pair of normally closed contacts C11 which are opened when the relay is energized. The relay R8 is a time delay relay and may be provided with suitable control means for regulating the rate of travel of the armature of the relay which at its uppermost limit of travel engages the normally open pair of contacts C12. When these contacts C12 are closed energy is supplied to the energizing coil of the relay R9. The relay R9 is provided with a plurality of sets of contacts which are normally closed. A normally closed set of contacts C13 is connected in series with the energizing coil of the relay R3. The movable contact of this pair of contacts is adapted to be moved in contact with another contact C14 which is connected to one end of the energizing coil of a relay R9. The movable contact of the pair of contacts C13 is connected through the normally closed contacts C7 of relay R5 to the alternating current conductor L2. Thus when the movable contact is moved to engage the contact C14 the energizing coil of the relay R9 is locked into self-holding circuit relationship.

The load coil G12 is arranged to be switched to different taps on the tank coil inductor G3 by means of a plurality of pairs of normally closed contacts C15 and C17 each having movable contacts adapted to cooperate with stationary contacts C16 and C18 respectively. This actuation of the relay R9 switches the load coil from the innermost taps on the tank coil to the outermost taps on the tank coil.

The operation of the system shown is based upon consideration of the operating characteristics graphically portrayed in Figure 2. In that figure the curve I shows the relationship between the oscillator anode current and the heating time. The curve of power output to the load corresponds to that anode current curve. The anode current or power output rising along the curve I, passes through a maximum and then begins to decrease as the impedance, represented by the curve Z, begins to increase because of the decreasing permeability of the metal as its temperature approaches the Curie point. When that temperature is reached the load impedance reaches the point O on the curve Z and the current is thereby reduced to the value represented by the portion S of the curve I. If the heating of the charge is continued without change, the temperature would thereafter follow along the substantially flat top portion of curve T. It is desired to prevent the plate current or power output from following curve I along its characteristic portion indicated by the flat portion S and to cause the temperature of the charge to continue to increase along the dotted curve TRM. By rematching the load at the point N on the curve I, the oscillator current will by that rematching be increased and the temperature will continue to rise at the rapid rate indicated by the curve TRM.

After the load has been inserted into the load coils G12, the timer T2 is placed into operation, the timer having previously been set to cause operation of the oscillator or generator G for a predetermined time interval dependent upon the material and size of the load to be heated. The initiation of operation of the timer T2 brings about energization of the relay R6 which opens the normally closed contact C8 and closes the normally open contacts C9. The opening of the contacts C8 of the relay R6 causes the relay R5 to be de-energized so as to close the normally closed contacts C7 to prepare a circuit subsequently to be described.

The closing of the contact C9 of the relay R6 energizes the relay R7 since at this time the relay R8 is de-energized and the contacts C11 are closed. The relay R7 closes its contacts C10 thereby to short circuit the power cut-off resistor G9 to permit the generator to start oscillations. Shortly after oscillations are initiated by the generator G, the flow of anode current in the tubes G1 and G2 causes a voltage drop to appear across the resistors G10 and G11. These voltage drops are proportional to the value of the plate current, and as soon as the plate current has reached a value equalling the point M on the curve I the relay R1 will respond since its energizing coil is connected across the voltage resistor G10. The relay R1 closes its contacts C1 to complete a circuit through the coil of relay R2 and the normally closed contacts C6 of relay R4 to energize relay R2. The relay R2 is a preparatory relay which operates to insure that the relay R3 will operate only after the generator G has been in operation sufficiently to proceed along its characteristic curve to the point N. Subsequently the generator passes through the maximum of the curve and goes on to the point N. The relay R2 closes its contacts C2 to lock the relay in circuit and also closes another pair of contacts C3 to complete a circuit for the energizing coil of relay R3. The energizing coil of relay R3 receives its energy by virtue of the conductivity of the vacuum tube V1. The vacuum tube V1 is normally non-conductive until the voltage drop appearing across the resistor G11 has decreased to the point corresponding to the value N on the curve I of Figure 2. When this point has been reached, the relay R3 will be energized to close its contacts C4 to complete a circuit from one side of the alternating current conductor L1 to the energizing coil of relay R4 and to the energizing coil of the time delay relay R8.

The relay R4 closes its contacts C5 to lock itself in circuit. The relay R4 also opens its contacts C6 to release or de-energize relay R2 which in turn de-energizes relay R3. The relay R2 in opening its contacts C3 therefore places the relay R3 and its associated vacuum tube V1 in condition for operation in the next heating or operating cycle of the oscillator G.

The time delay relay R8 having been energized by the relay R4 which was locked into operation when energized from relay R3 slowly moves its armature so as to open the contacts C11. This interrupts the circuit through the relay R7 so that the contacts C10 are opened thereby reinserting the power cut off resistor G9 into the cathode circuit of the vacuum tubes G1 and G2 to stop oscillations. The time delay relay R8 subsequently closes contact C12 to complete an energizing circuit to the energizing coil of relay R9. The relay R9 opens the pairs of contacts C13, C15, and C17. The movable contacts of the pairs of contacts C15 and C17 subsequently engage the contacts C16 and C18 respectively to switch the load coil to the outer taps of the tank coil G3. At the same time the movable contact of the pair of contacts G13 engages contact C14 to complete a lock-in or holding circuit for the energizing coil of the relay R9. These contacts are arranged in parallel to the contacts C12 of the time delay relay R8. When the contacts C13 are interrupted, the circuit for the energizing coil of relay R8 is interrupted so that the armature now slowly drops downwardly to subsequently close the contacts C11 thereby to energize the relay R7 and to close the contact C10.

The contacts C10 short circuit the power cutoff resistor G9 thereby permitting the generator G to again begin oscillating and to supply power to the load coil G12 which has been rematched with respect to the tank coil G3. During the rematching operation of the oscillator G relays R4, R6, R7 and R9 are energized. When the heating cycle has been completed the timer T2 will de-energize the relay R6 which will open its contacts C9 to de-energize the relay R7 and to stop oscillations of the generator G. The relay R6 closes its contacts C8 to energize relay R5. Relay R5 opens its contacts C7 to interrupt the circuits to the relays R4 and R9 thus placing these relays in condition for a subsequent cycle of operation. The relay R4 when de-energized by the opening of the contacts C7 of relay R5 opens its contacts C5 thereby interrupting the circuit to the energizing coil of relay R5. All the relays therefore are de-energized and ready for the next cycle of operation.

While for the purpose of describing and illustrating the present invention, a certain circuit arrangement has been shown in the drawing, it is to be understood that such variations in the circuit arrangement and in the instrumentalities employed therein may be made as may be commensurate with the spirit and scope of the invention set forth in the appended claims.

This invention is hereby claimed as follows:

1. An electric high frequency heating system an electronic tube oscillator having an anode current characteristic which passes through a maximum and having a tapped tank coil, a load circuit, impedance matching switching means interconnecting said load circuit with said tank coil, a time control mechanism to start and stop operation of said oscillator and a sequence operation relay system interconnecting said time control mechanism and said impedance matching switching means, said relay system including means responsive to a predetermined value of decreasing anode current to actuate said switching means, and means responsive to a predetermined initial rising value of the anode current for preparing said first mentioned means for operation.

2. An electric high frequency system having a vacuum tube oscillator whose anode current characteristic passes through a maximum, a load circuit, impedance matching means interconnecting said load circuit with said oscillator, means responsive to a predetermined value of decreasing anode current for actuating said impedance matching means, and means interposed between said latter means and said impedance matching means for rendering said tube oscillator inoperative for a period of time immediately prior to and until immediately subsequent to the operation of said impedance matching means.

3. In an electric high frequency heating system, an electronic oscillator having an anode current characteristic which passes through a maximum and a tapped tank coil, a load circuit, impedance matching means including a switch interconnecting said load circuit to selected taps on said tank coil, a control circuit including a relay for operating said switch, a Thyratron responsive to a predetermined value of anode current to actuate said relay, and means normally rendering said Thyratron inoperative to actuate said relay and responsive to a value of anode current greater than said predetermined value for rendering said Thyratron operative to actuate said relay as the anode current in decreasing from said maximum value reaches said predetermined value.

4. In high frequency heating apparatus, an electronic tube oscillator having an anode current characteristic which passes through a maximum and a tank coil, a load circuit, means for adjustably coupling said load circuit to said tank coil, a relay, means controlled by said relay for actuating said coupling means to change the coupling, an operating circuit for said relay including a space discharge tube responsive to a predetermined value of anode current less than maximum, and means responsive to the anode current of the tube oscillator for rendering said operating circuit ineffective to operate said relay on the rising portion of said anode current characteristic and effective to operate said relay at said predetermined value on the falling portion of said characteristic.

5. In high frequency heating apparatus, an electronic tube oscillator having an anode circuit in which the characteristic of the anode current passes through a maximum value and a tank coil, a load circuit, means for adjustably coupling said load circuit to said tank coil, a first relay having its operating coil in said anode circuit and responsive to the predetermined value of the anode current, a second, self-locking relay operated by said first relay, a control circuit including a Thyratron responsive to a predetermined value of anode current less than the value of current to which the first relay responds, and a third relay, said second relay having contacts controlling said control circuit for rendering said circuit ineffective to operate the third relay on a rising portion of the anode current characteristic and effective to operate said third relay on the falling portion of said characteristic, a time delay relay operated by said third relay for operating said coupling means to change the coupling a predetermined time after said control circuit is rendered effective to operate said third relay, and means controlled by said time delay relay for stopping the operation of the oscillator during change of the coupling.

EUGENE MITTELMANN.

REFERENCES CITED

The following references are of record in the file of this patent:

UNITED STATES PATENTS

| Number | Name | Date |
| --- | --- | --- |
| 2,324,525 | Mittelmann | July 20, 1943 |
| 2,333,001 | Goldstine | Oct. 26, 1943 |